United States Patent
Line et al.

(10) Patent No.: US 11,541,799 B2
(45) Date of Patent: Jan. 3, 2023

(54) ADJUSTMENT MECHANISM FOR SEATING ASSEMBLY MEMBER

(71) Applicant: Ford Global Technologies, LLC, Dearborn, MI (US)

(72) Inventors: Johnathan Andrew Line, Northville, MI (US); Ratan Howlader, Novi, MI (US); Robert Charles Shipley, Westland, MI (US); Patrick Davis, Royal Oak, MI (US); Ian James, Windsor (CA); Nicholas Alphonse Billardello, Macomb, MI (US); David Frederick Lyons, New Haven, MI (US); Sean Bayle West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/841,032

(22) Filed: Jun. 15, 2022

(65) Prior Publication Data
US 2022/0305976 A1   Sep. 29, 2022

Related U.S. Application Data

(62) Division of application No. 17/201,098, filed on Mar. 15, 2021, now Pat. No. 11,396,253.

(51) Int. Cl.
*B60N 2/90* (2018.01)
*B60N 2/68* (2006.01)
*B60N 2/20* (2006.01)

(52) U.S. Cl.
CPC .............. *B60N 2/99* (2018.02); *B60N 2/206* (2013.01); *B60N 2/68* (2013.01)

(58) Field of Classification Search
CPC .................................. B60N 2/99; B60N 2/995
See application file for complete search history.

(56) References Cited

U.S. PATENT DOCUMENTS

| | | | |
|---|---|---|---|
| 2,843,195 | A  | 7/1958 | Barvaeus |
| 3,883,173 | A  | 5/1975 | Shephard et al. |
| 5,570,931 | A  | 11/1996 | Kargilis et al. |
| 7,086,700 | B2 | 8/2006 | Habedank |
| 7,255,399 | B2 | 8/2007 | White et al. |
| 7,264,310 | B2 | 9/2007 | Holdampf et al. |
| 7,490,900 | B2 | 2/2009 | Szczudrawa |

(Continued)

FOREIGN PATENT DOCUMENTS

| | | |
|---|---|---|
| FR | 2562003 A1 | 10/1985 |
| GB | 2426192 A  | 11/2006 |

(Continued)

*Primary Examiner* — Timothy J Brindley
(74) *Attorney, Agent, or Firm* — Vichit Chea; Price Heneveld LLP

(57) ABSTRACT

A seating assembly having a seating assembly frame that includes a seat frame and a seatback frame. The seating assembly includes an extension member coupled to the seat frame and movable in response to an actuating force between an extended position relative to the seat frame and a compressed position relative to the seat frame and including an end fixedly coupled to the seat frame and an end coupled to an adjustment device disposed on the seat frame.

9 Claims, 8 Drawing Sheets

(56) References Cited

U.S. PATENT DOCUMENTS

| | | | |
|---|---|---|---|
| 8,162,397 B2 * | 4/2012 | Booth | B60N 2/62 |
| | | | 297/284.3 |
| 8,886,413 B2 | 11/2014 | Hozumi et al. | |
| 9,145,073 B2 | 9/2015 | Andersson et al. | |
| 9,187,019 B2 | 11/2015 | Dry et al. | |
| 9,776,543 B2 | 10/2017 | Line et al. | |
| 11,076,697 B1 | 8/2021 | Line et al. | |
| 2003/0127895 A1 | 7/2003 | Stiller et al. | |
| 2006/0082208 A1 * | 4/2006 | Beermann | B60N 2/22 |
| | | | 297/452.11 |
| 2006/0273644 A1 | 12/2006 | Sturt et al. | |
| 2015/0069811 A1 * | 3/2015 | Sachs | B60N 2/5642 |
| | | | 297/452.47 |
| 2019/0241099 A1 | 8/2019 | Sugiyama et al. | |
| 2021/0129718 A1 | 5/2021 | Hunsaker | |
| 2021/0245642 A1 | 8/2021 | Lee et al. | |
| 2021/0309136 A1 * | 10/2021 | Line | B60N 2/995 |

FOREIGN PATENT DOCUMENTS

| | | |
|---|---|---|
| GB | 2447309 A | 9/2008 |
| JP | H02147065 | 12/1990 |
| JP | 2009096423 A | 5/2009 |

* cited by examiner

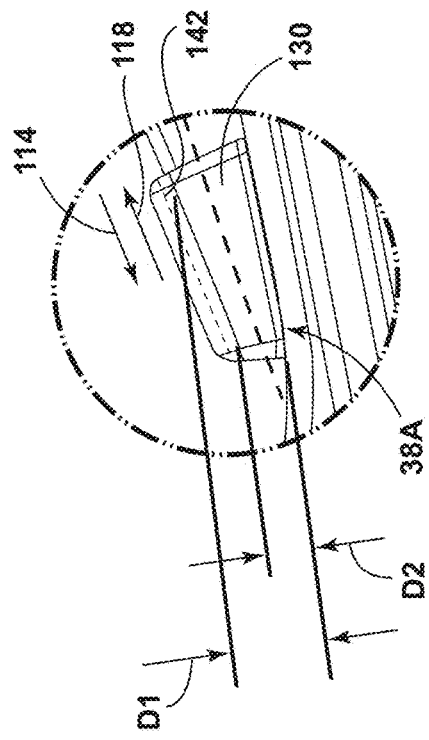
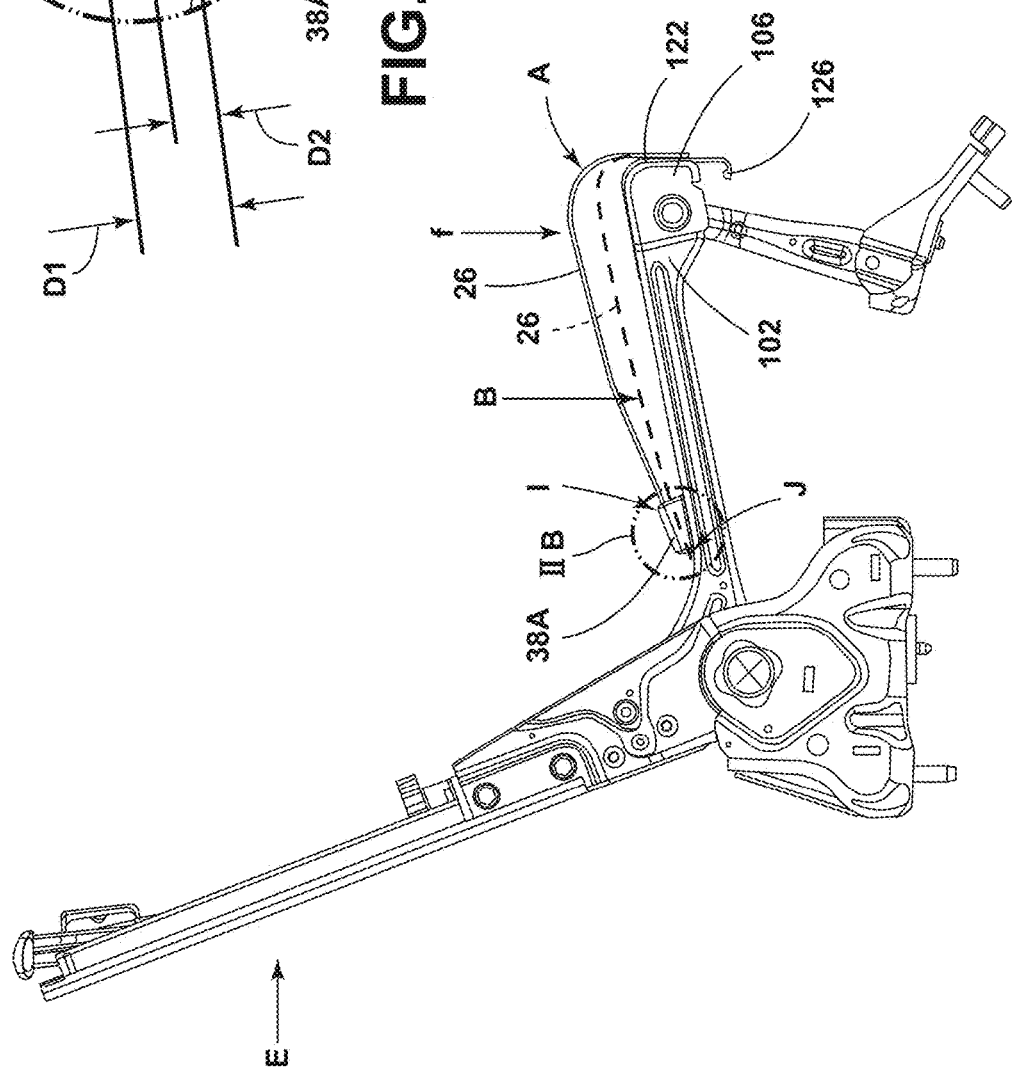
FIG. 2B
FIG. 2A

ADJUSTMENT MECHANISM FOR SEATING ASSEMBLY MEMBER

CROSS-REFERENCE TO RELATED APPLICATION

This application is a divisional of U.S. patent application Ser. No. 17/201,098 filed Mar. 15, 2021, now U.S. Pat. No. 11,396,253 entitled "ADJUSTMENT MECHANISM FOR SEATING ASSEMBLY MEMBER." The aforementioned related application is hereby incorporated by reference.

FIELD OF THE DISCLOSURE

The present disclosure generally relates to a seating assembly for a vehicle.

BACKGROUND OF THE DISCLOSURE

Seating assemblies may include components that may move between different positions to accommodate different seating assembly needs. Improved movable components for seating assemblies are desired.

SUMMARY OF THE DISCLOSURE

According to a first aspect of the present disclosure, a seating assembly is provided. The seating assembly includes a seating assembly frame that includes a seat frame and a seatback frame. The seating assembly further includes an extension member coupled to the seat frame and movable in response to an actuating force between an extended position relative to the seat frame and a compressed position relative to the seat frame that includes an end fixedly coupled to the seat frame, and an end coupled to an adjustment device disposed on the seat frame.

Embodiments of the first aspect of the present disclosure can include any one or a combination of the following features:
  the adjustment device includes a guide member disposed at a rear portion of the seat frame;
  the extension member is movable between a primary position in the guide member when the extension member is in the extended position and a secondary position in the guide member when the extension member is in the compressed position;
  the end fixedly coupled to the seat frame is disposed along a curved plate at a front portion of the seat frame;
  the guide member includes an oblong structure having a channel through which the extension member slides as the extension member moves between the extended position and the compressed position;
  the adjustment device includes a bracket rotatably coupled to a front portion of the seat frame and configured to receive an end of the extension member;
  the end of the extension member fixedly coupled to the seat frame is disposed at a rear portion of the seat frame;
  the bracket is rotatable about an axis of rotation extending transverse to the extension member;
  the bracket is rotatable between an initial position defined by the extension member in the extended position and a final position defined by the extension member in the compressed position;
  the bracket includes a stop member configured to abut a structural component of a seat to limit rotation of the bracket in the final position;
  the structural component includes a seat leg;
  the bracket includes a first link and a second link, wherein each of the first link and the second link are pivotably coupled to the seat frame at a pivotable coupling defined by the axis of rotation, and wherein the first link and the second link each extend outward from the pivotable coupling;
  the extension member is coupled to the first link and wherein the stop member is coupled to the second link; and/or
  the actuating force includes a force exerted by a seatback on the seat when the seatback is in a flat position.

According to a second aspect of the present disclosure, a vehicle seating assembly is provided. The vehicle seating assembly includes a seatback pivotably coupled to a seat and movable between an upright position and a folded position and includes a pair of extension members each coupled to front and rear portions of a seat frame and configured to move from an extended position to a compressed position in response to an actuating force disposed on the pair of extension members by the seatback in the folded position, and a pair of adjustment devices disposed on opposing lateral sides of the seat frame and at one of the front or rear portions of the seat frame, wherein the pair of adjustment devices are coupled to the pair of extension members, wherein the pair of extension members in the extended position defines a pair of bolsters.

Embodiments of the second aspect of the present disclosure can include any one or a combination of the following features:
  the pair of adjustment devices includes a pair of guides mounted to the seat frame and wherein the pair of extension members slides into each of the pair of guides in a first direction in response to an application of the actuating force on the pair of extension members and wherein the pair of extension members slides out of each of the pair of guides in a second direction in response to a removal of the actuating force from the pair of extension members;
  the pair of extension members includes bolster wires; and/or
  the pair of adjustment devices includes a pair of brackets disposed on opposing sides of the seat frame and pivotably coupled to the seat frame at pivotable couplings defined by an axis of rotation extending transverse to the pair of adjustment devices and wherein the pair of extension members are coupled to the pair of brackets such that application of an actuating force on the pair of extension members in the extended position causes the pair of brackets to rotate from an initial position to a final position about the axis of rotation, thereby moving the pair of extension members from the extended position to the compressed position.

According to a third aspect of the present disclosure, a vehicle seat in provided. The vehicle seat includes a seat frame that includes opposing first and second portions. The vehicle seat further includes an extension member extending between the first portion of the seat frame and the second portion of the seat frame and having an end fixedly coupled to the first portion of the seat frame and an end rotatably coupled to a rotating member disposed around a pivotable coupling disposed on the second portion of the seat frame, wherein the rotating member disposed around the pivotable coupling is rotated between an initial position and a final position as the extension member is moved between an extended position and a compressed position.

Embodiments of a third aspect of the present disclosure can include any one or a combination of the following features:
- the first portion of the seat frame includes a rear portion of the seat frame, wherein the second portion of the seat frame includes a front portion of the seat frame, and wherein the extension member includes a bolster support.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2A is a right side elevational view of a seating assembly with an extension member disposed in a guide member in an extended position and the extension member disposed in the guide member in a compressed position, according to an aspect of the disclosure;

FIG. 2B is a right side elevational view of a guide member, according to an aspect of the disclosure;

DETAILED DESCRIPTION OF THE PREFERRED EMBODIMENT

Figure 1:
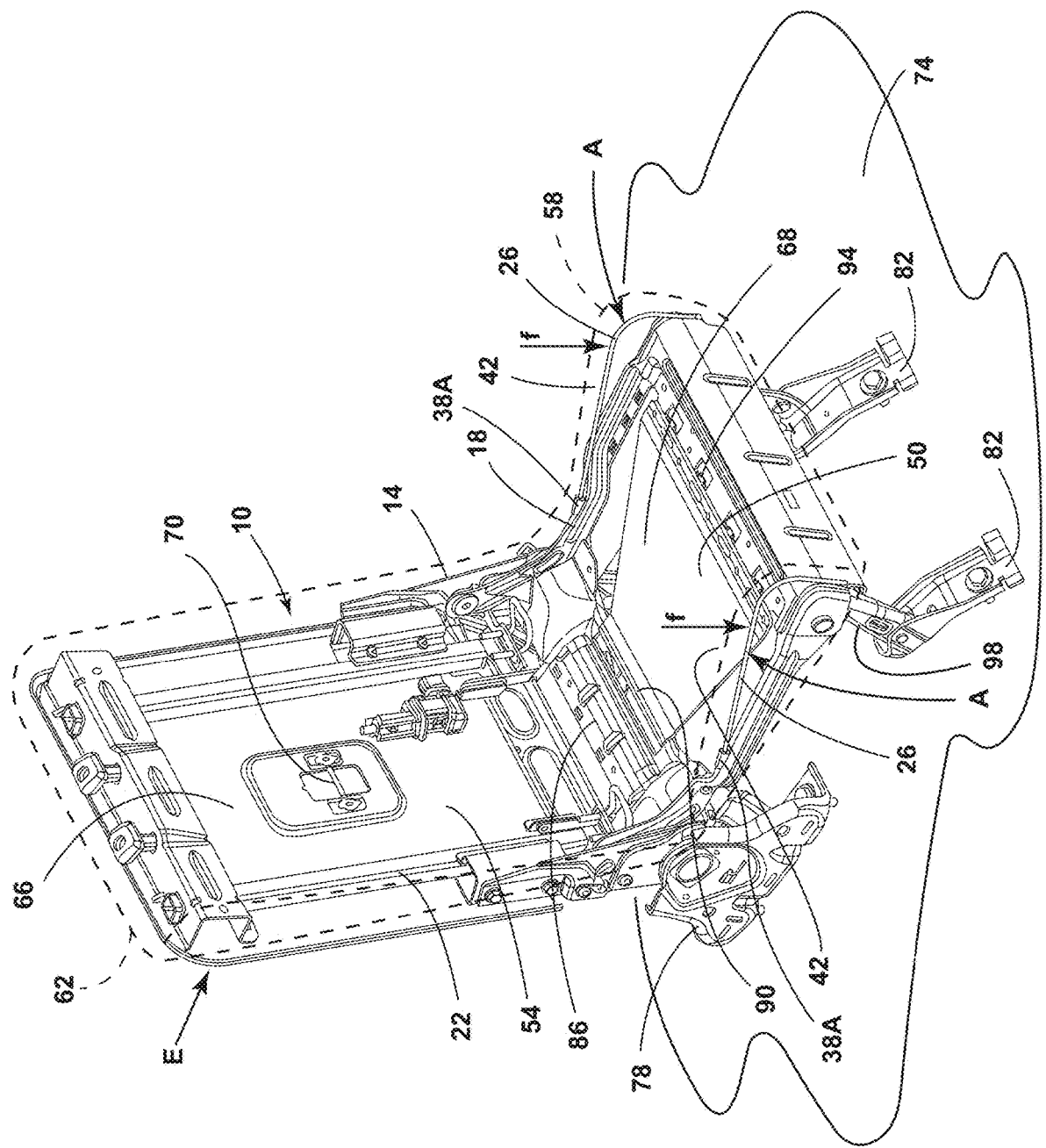
FIG. 1 is a right side perspective view of a seating assembly with extension members in extended positions disposed in guide members, according to an aspect of the disclosure.

With reference to the vehicle seating assemblies 10 described below and shown in the attached figures, a vehicle seating assembly 10 may be described from the vantage point of an occupant seated in the seating assembly 10. The side of a seating assembly 10 disposed on a right side of a seated occupant may be referred to as a right side of the seating assembly 10. The side of the seating assembly 10 disposed on a left side of a seated occupant may be referred to as a left side of the seating assembly 10.

Referring to FIGS. 1-8, a seating assembly 10 includes a seating assembly frame 14. The seating assembly frame 14 includes a seat frame 18 and seatback frame 22. An extension member 26 is coupled to the seat frame 18 and movable in response to an actuation force f between an extended position A relative to the seat frame 18 and a compressed position B relative to the seat frame 18. The extension member 26 includes an end fixedly coupled to the seat frame 18 and an end coupled to an adjustment device disposed on the seat frame 18.

Customers desire a vehicle that may be used for various purposes. Therefore, it is advantageous to configure vehicle seating assemblies 10 to use vehicle space in multiple ways. A seating assembly 10 that includes extension members 26 may be configured in various ways. The seating assembly 10 may include a seatback 54 and a seat 50 with extension members 26 that may define bolsters 42 of the seat 50. Bolsters 42 may stabilize the movement of a seated occupant during vehicle use. The extension members 26 that define the bolsters 42 may be in an extended position A when the seatback 54 is in an upright position E. The extension members 26 may be compressed as the seatback 54 moves from the upright position E to the folded position F to create the load floor 46. The extension members 26 may be in the compressed position B when the seatback 54 is in the folded position F. As the seating assembly 10 is moved from the folded position F to the upright position E, the extension members 26 may move from the compressed position B to the extended position A. In the extended position A, the extension members 26 define the bolsters 42 that create a comfortable seating space for an occupant.

Referring to FIG. 1, a seating assembly 10 may include a seating assembly frame 14. The seating assembly frame 14 may include a seat frame 18 and a seatback frame 22. A seatback panel 66 may be disposed on the back of the seatback frame 22. The seatback panel 66 may define the load floor 46 when the seatback 54 is in the folded position F. The seatback panel 66 may provide support for a seatback cushion 62 disposed in the seatback frame 22. A tether 70 may be disposed in the seatback panel 66. A seat panel 68 may be positioned in the seat frame 18. The seat panel 68 may provide support for a seat cushion 58 disposed above the seat panel 68. The seating assembly 10 may be mounted to a vehicle floor 74 with rear mounts 78 and front mounts 82. Rear mounts 78 may be disposed on opposing sides of a cross bar 86 extending proximate the bite line of the seat 50. The bite line may refer to the location at which the seat 50 and the seatback 54 come together. The seating assembly 10 may include front mounts 82 positioned below a front portion 94 of the seat frame 18. The front mounts 82 may include seat legs 98 that may extend away from the seat frame 18 and toward the vehicle floor 74.

Figure 3:
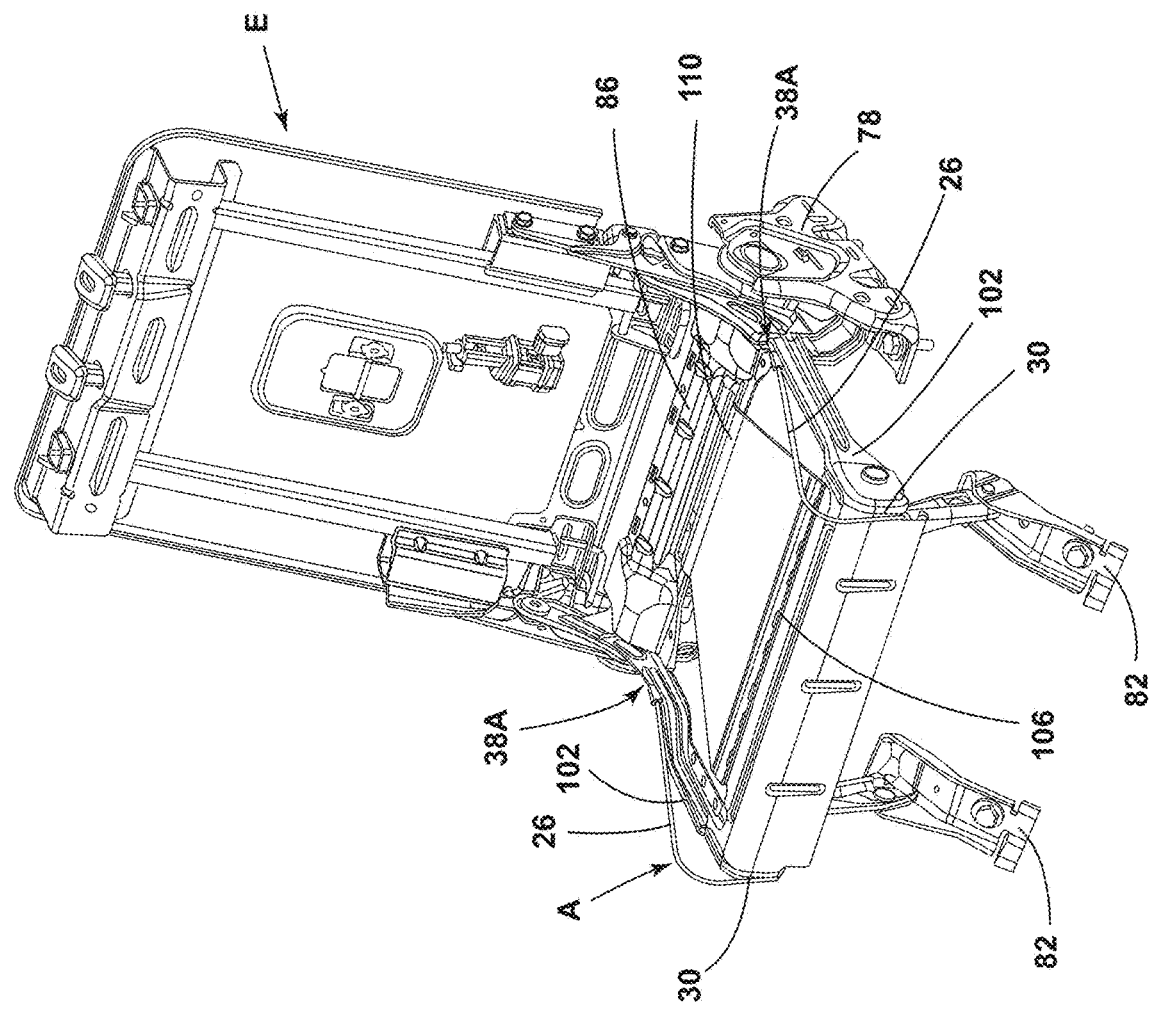
FIG. 3 is a left side perspective view of a seating assembly with extension members in extended positions disposed in guide members, according to an aspect of the disclosure.

With reference to FIGS. 1-3, the seating assembly 10 may include a pair of opposing extension members 26 disposed on opposing sides of the seat frame 18. In the example shown, the seat frame 18 includes a pair of opposing side brackets 102, a front cross member 106, and a rear cross member 110. The seat frame 18 may include a front portion 94 and a rear portion 90. An end 30 of each of the extension members 26 may be fixedly coupled to each of the opposing side brackets 102. An end 34 of each of the extension members 26 may be coupled to the adjustment devices 38 disposed on each of the side brackets 102. In the example shown, the adjustment devices 38 may include guide members 38A. The guide members 38A may be referred to as guides. The extension members 26 may be disposed in the extended position A or the compressed position B. The pair of extension members 26 may slide into the guide members 38A in a first direction 114 in response to an application of an actuation force F on the pair of extension members 26. The pair of extension members 26 may slide out of the guide members 38A in a second direction 118 in response to the removal of the actuation force f. The extension members 26 may be movable between a primary position I in the guide member 38A when the extension member 26 is in the extended position A and a secondary position J in the guide member 38A when the extension member 26 is in the compressed position B. The fixed ends 30 of each of the pair of extension members 26 may be coupled to a front plate 122 extending along the front cross member 106. Each of the pair of extension members 26 may be disposed along the front plate 122. The front plate 122 may be curved. The front plate 122 may provide a comfortable surface for support of the calves of an occupant. The front plate 122 may include an inward-extending portion 126 that may be curved under the seat 50.

With continued reference to FIGS. 1-3, the guide members 38A may have an oblong structure. The guide members 38A may include an internal channel 130 with a variable diameter 134. The diameter D1 of the internal channel 130 at a location closer to the front portion 94 of the seat frame 18 may be greater than the diameter D2 of the internal channel 130 at a location further from the front portion 94 of the seat frame 18. The variable diameter 134 between the location closer to the front portion 94 of the seat frame 18 and the location further from the front portion 94 of the seat frame 18 may direct the extension member 26 downward and toward the seat when the extension member 26 moves from the extended position A to the compressed position B in response to an actuation force F. Additionally, the internal channel 130 may include an upper portion 138 extending along a downward slope 142 from the front portion of the seat frame 18 to the rear portion 90 of the seat frame 18. The downward slope 142 may be advantageous for compressing the extension member 26. It is to be understood that the guide members 38A may have a structure other than the structure shown. For example, the guide members 34A may be integrated into the side brackets 102 of the seat frame 18 or other portions of the seat frame 18. The guide members 38A may include guide sleeves.

With continued reference to FIGS. 1-3, the extension member 26 may be made of metal, composite, or another material. A metal extension member 26 may include a spring steel. The extension member 26 may be stiff or flexible. The extension members 26 may include bolster wires that may be made of steel. The bolster wires may also be made of a composite, a carbon fiber and epoxy resin mixture, or other materials. The material of the guide members 34A and the material of the bolster wires may be selected to minimize friction between the guide members 34A and the bolster wires. The extension members 26 may include bolster supports. The internal channel 130 of the guide members 34A may be various shapes (for example, rectangular). The extension member 26 may have various shapes (for example, rectangular) that may be compatible with the internal channel 130.

Referring again to FIGS. 1-3, the location of the pair of guide members 34A and the pair of extension members 26 on the side brackets 102 of the seat frame 18 may be advantageous because the extension members 26 may be disposed on the side brackets 102 prior to the attachment of the side brackets 102 to the front cross member 106 and the rear cross member 110 during assembly of the seat frame 18. Additionally, the location of the pair of guide members 34A and the pair of extension members 26 on the side brackets 102 may form bolsters 42 on the sides of the seats 50 so that the bolsters 42 may stabilize a seated occupant or cargo disposed on the seat 50.

With continuing reference to FIGS. 1-3, the actuation force f exerted on the extension members 26 to move the extension members 26 from the extended position A to the compressed position B may include a force exerted by cargo placed on the seat surface. The actuation force f exerted on the extension members 26 to move the extension members 26 from the extended position A to the compressed position B may be the force exerted by the seatback 54 on the seat 50 when the seatback 54 is in the folded position F. See, for example, FIGS. 6 and 8.

Referring to FIGS. 4-8, a vehicle seat 50 includes a seat frame 18 having opposing first and second portions. The vehicle seat 50 includes an extension member 26 extending between the first portion of the seat frame 18 and the second portion of the seat frame 18. The extension member 26 has an end fixedly coupled to the first portion of the seat frame 18 and an end rotatably coupled to a rotating member 38B disposed around a pivotable coupling 154 disposed on the second portion of the seat frame 18. The rotating member 38B is disposed around the pivotable coupling 154 is rotatable between an initial position M and a final position N as the extension member 26 is moved between an extended position A and a compressed position B. If the rotating member 38B is in the initial position M, then the seat legs 98 may be in the first position Q. If the rotating member 38B is in the final position N, then the seat legs 98 may be in the second position R. The seat legs 98 may rotate about the axis of rotation 162 or another axis of rotation substantially parallel to axis of rotation 162 between the first position Q and the second position R of the seat legs 98. The seat legs 98 may rotate about an axis of rotation 164 between the first position Q and the second position R of the seat legs 98. In the example shown, the first portion of the seat frame 18 may include a rear portion 90 of the seat frame 18, and the second portion of the seat frame 18 may include a front portion 94 of the seat frame 18. The extension member 26 may include a flat strip. In the example shown, the rotating member 38B includes a bracket 150.

Figure 4:
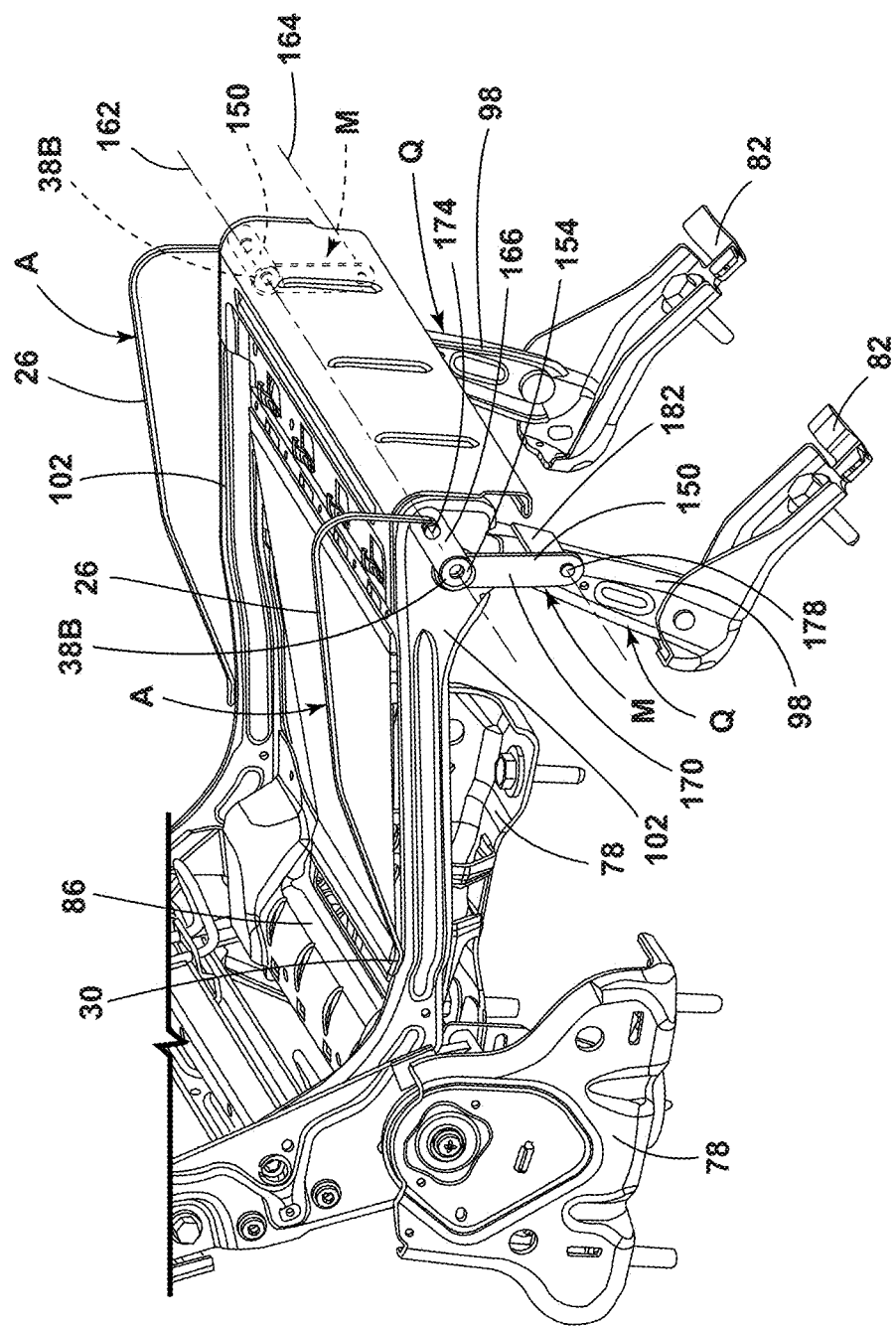
FIG. 4 is a right side perspective view of a portion of the seating assembly with extension members in extended positions and brackets, according to an aspect of the disclosure.

Referring to FIG. 4, one end 30 of an extension member 26 may be fixedly coupled to a rear portion 90 of the side bracket 102. Another end 34 of the extension member 26 may be fixedly coupled to a rotating member 38B disposed at a pivotable coupling 154 between the rotating member 38B and the side bracket 102. The rotating member 38B may include a bracket 150. The bracket 150 may be rotatable about an axis of rotation 162 extending through the pivotable coupling 154 and the front portion 94 of the seat frame 18. The axis of rotation 162 may be transverse to the extension member 26. In the example shown, the bracket 150 includes first and second links 166, 170. The first and second links 166, 170 each extend outward from the pivotable coupling 154. The first link 166 includes a pin 174. The extension member 26 may be coupled to the pin 174. The second link 170 includes a pin 178. A flange 182 may extend from the pin 178.

With continued reference to FIG. 4, a flange 182 may extend transversely away from the second link 170 and in a direction toward a bottom of the seat 50. The flange 182 may abut a structural component of the seat 50 to limit rotation of the bracket 150 in the initial position M and the final position N. In the example shown, the structural component includes a seat leg 98. The flange 182 may be referred to as a stop member. In addition to the rectangular shape of the flange 182 shown, the flange 182 may include a variety of other shapes, configurations, and structures. In various aspects of the disclosure, the flange 182 may be mounted on the seat leg 98 or another structure at such a position that the first link 166 or the second link 170 of the bracket 150 abuts the flange 182 in the initial position M and the final position N of the bracket 150 to generally limit rotation of the bracket 150. The bracket 150 may be positioned on the side bracket 102 to minimize interference of the bracket 150 with a seated occupant and to provide space for the bracket 150 to rotate. The extension member 26 is shown in the extended position A.

Figure 5:
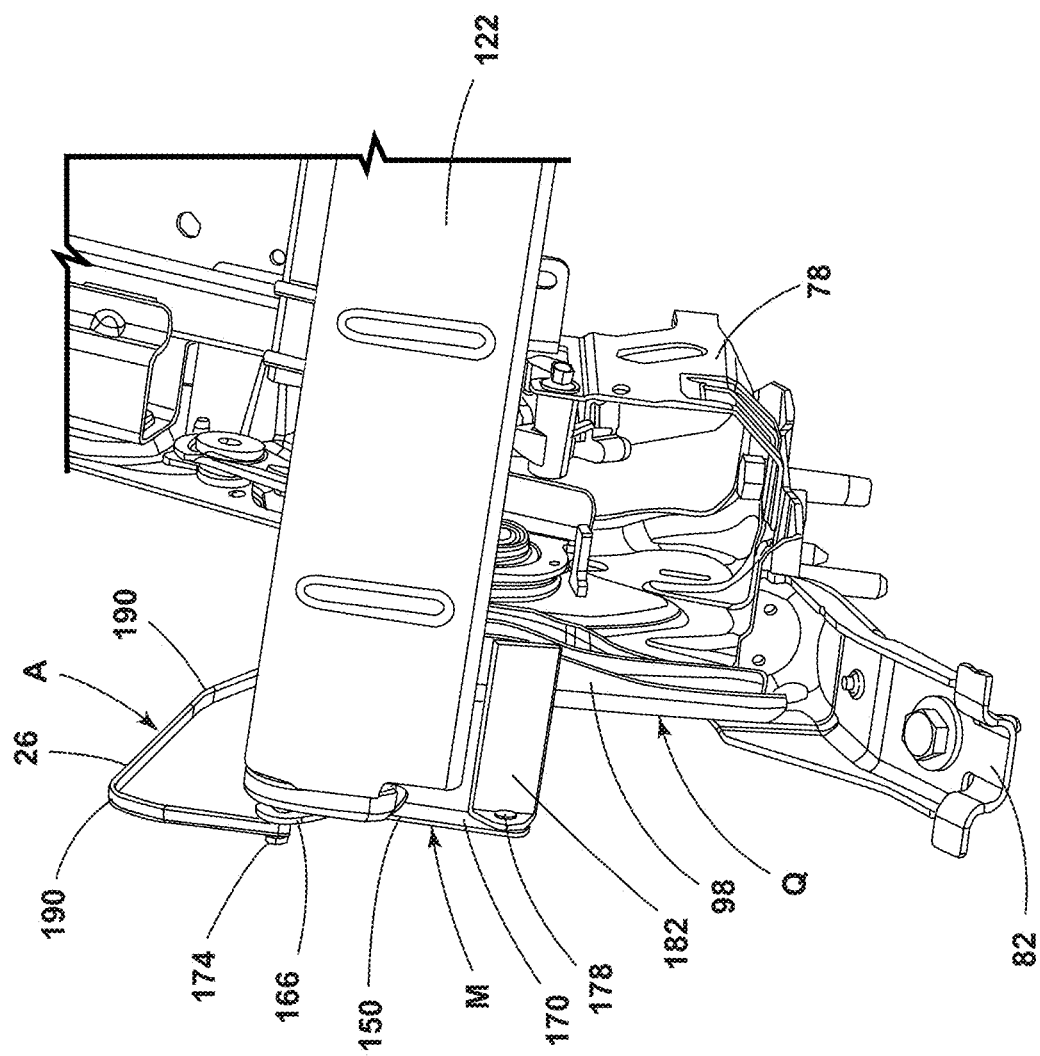
FIG. 5 is a front perspective view of a portion of the seating assembly with an extension member in the compressed position and a bracket, according to an aspect of the disclosure.

Referring to FIG. 5, the bracket 150 is shown disposed on the outside of the side bracket 102. The bracket 150 may be disposed adjacent to the side bracket 102. The bracket 150 may include a first link 166 and a second link 170. A pin 174 may extend from the first link 166. The extension member 26 may be disposed around the pin 174 extending from the first link 166. The extension member 26 may have several bends 190. The flat strip may be a metal, a composite, or an epoxy resin with carbon fiber. A metal extension member 26 may include a spring steel. The second link 170 may include a pin 178 for securing the flange 182 to the second link 170. The flange 182 may be disposed proximate the seat leg 98 of the seating assembly 10.

With continued reference to FIG. 5, the bracket 150 may have a variety of configurations and shapes in addition to the configuration and shape shown. The bracket 150 including the first and second links 166, 170 may be a unitary part. See, FIG. 6. The bracket 150 including the first and second links 166, 170 may include separate parts, for example separate first link 166 and second link 170. The bracket 150 may have a rounded shape.

Figure 6:
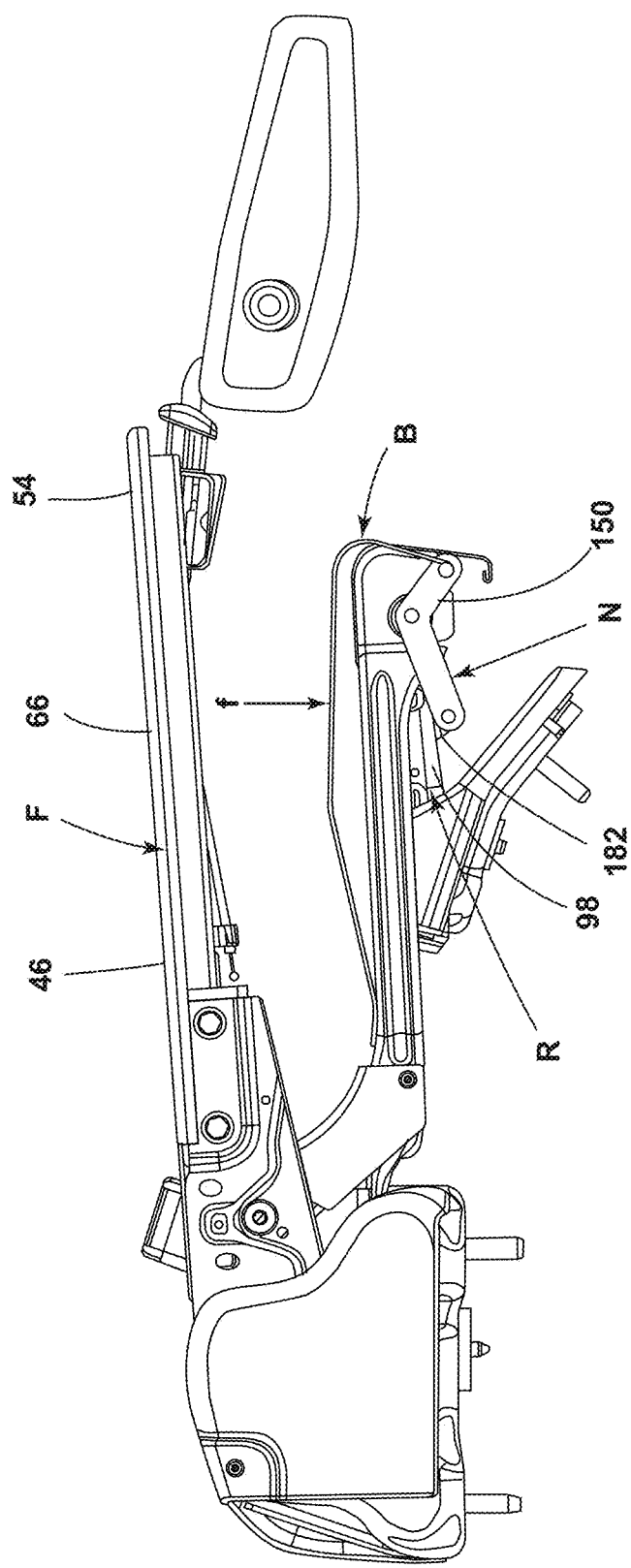
FIG. 6 is a right side elevational view of a seating assembly with a seatback in the folded position, an extension member in the compressed position, and a bracket, according to an aspect of the disclosure.

Referring to FIG. 6, the seating assembly 10 is shown with the seatback 54 in the folded position F. In the folded position F, the seatback panel 66 may function as a load floor 46 on which cargo may be disposed. If the seatback 54 is in a folded position F, the seatback 54 may exert an actuation force f on the seat 50 to move the extension members 26 from the extended position A to the compressed position B, thereby moving the bracket 150 from the initial position M to the final position N. In one example, the seatback frame 22 may be disposed substantially parallel to the seat frame 18 in the folded position F. The flange 182 may be disposed against the seat leg 98 when the bracket 150 is in the initial position M and the final position N.

Figure 7:
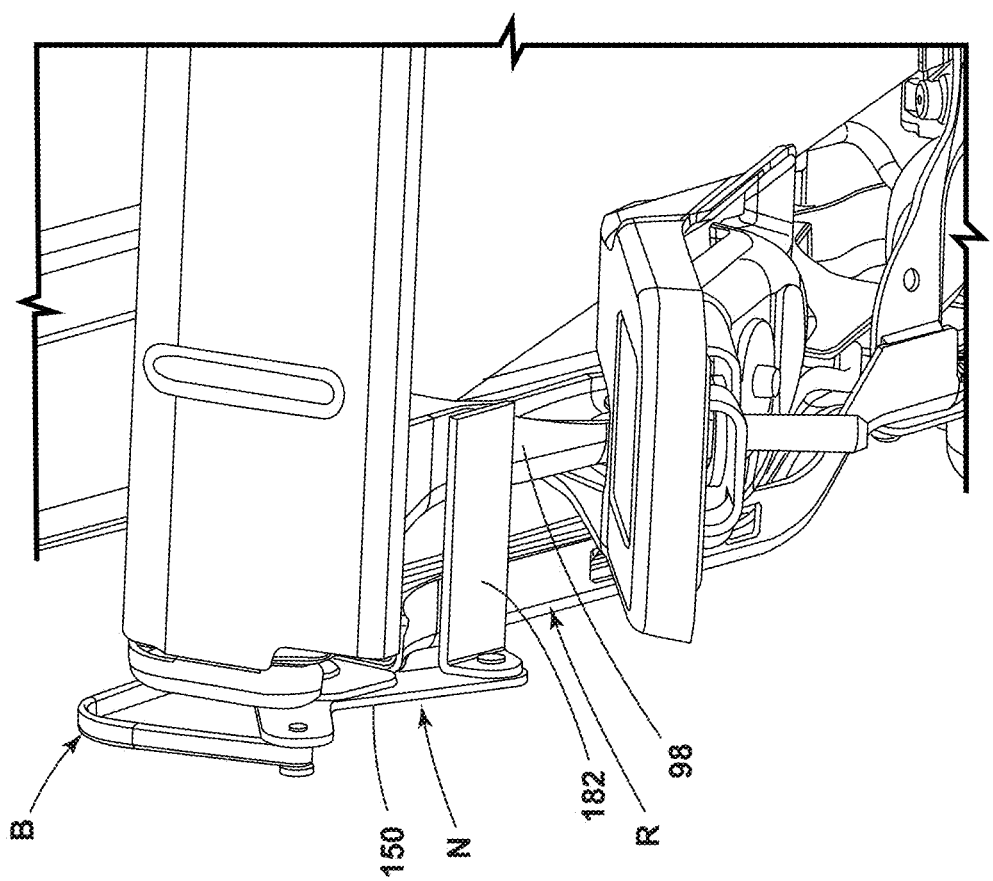
FIG. 7 is a front perspective view of a portion of the seating assembly with an extension member in the compressed position and a bracket, according to an aspect of the disclosure.

With reference to FIG. 7, the flange 182 is shown disposed against the seat leg++.

Figure 8:
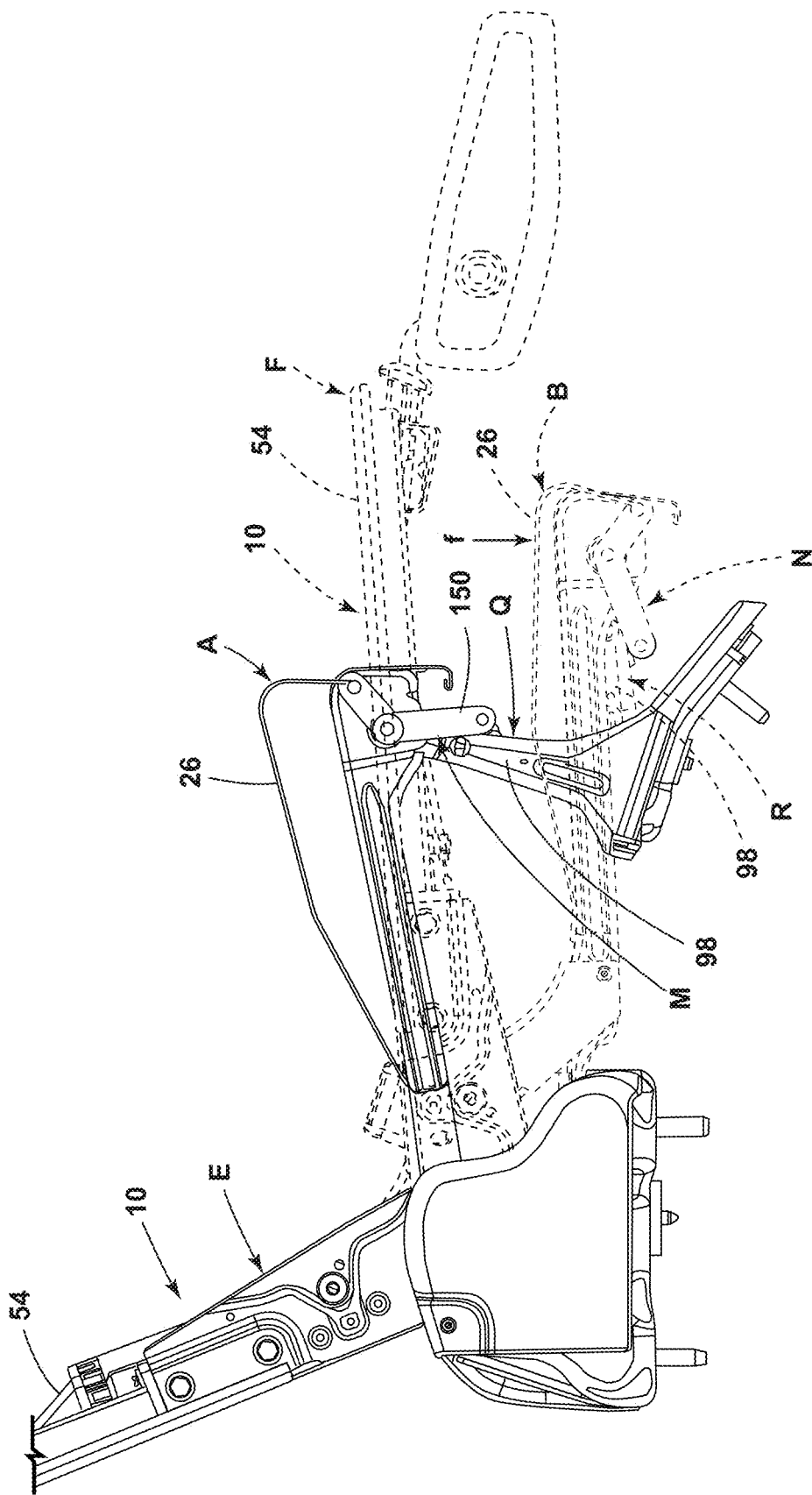
FIG. 8 is a right side elevational view of a seating assembly with the seatback in an upright position and the extension member in the extended position and a seating assembly with the seatback in a folded position, according to an aspect of the disclosure.

Referring to FIG. 8, the seating assembly 10 may be positioned with the seatback 54 in an upright position E and the seatback 54 in a folded position F. The extension member 26 may be positioned in an extended position A and a compressed position B. The bracket 150 may be positioned in an initial position M and a final position N.

Referring to FIGS. 1-8, a vehicle seating assembly 10 may include a seatback 54 pivotably coupled to a seat 50 and movable between an upright position E and a folded position F. The seating assembly 10 may include a pair of extension members 26 each coupled to front and rear portions 94, 90 of the seat frame 18 and configured to move from an extended position A to a compressed position B in response to an actuation force f disposed on the pair of extension members 26. The seating assembly 10 may include a pair of adjustment devices 34 disposed on opposing lateral sides of the seat frame 18 and at one of the front or rear portions 94, 90 of the seat frame 18. The pair of adjustment devices 34 may be coupled to the pair of extension members 26.

With reference to FIGS. 1-8, it is to be understood that the extension members 26 may be biased in a variety of ways to return to the extended position A from the compressed position B upon removal of the actuation force f Additionally, an adjustment device 38 may include a biasing mechanism that may store energy when the extension member 26 moves from an extended position A to a compressed position B and that may release energy when the extension member 26 moves from a compressed position B to an extended position A.

With reference to FIGS. 1-8, it is be understood that powered actuation may be used to move an extension member 26 between an extended position A and a compressed position B. A power actuator for moving an extension member 26 between an extended position A and a compressed positon may include a cable actuator. Powered actuation may be used to move an extension member 26 between a compressed position B and an extended position A. A power actuator for moving an extension member 26 between a compressed position B and an extended position A may include a cable actuator.

It is to be understood that the extension members 26 may have different cross-sectional areas and shapes along their lengths. The extension members 26 may include segments of various materials and sizes.

It is to be understood that extension members 26 and adjustment devices 34 may be positioned on the seat frame 18 in various orientations. For example, an extension member and an adjustment device may be positioned laterally across the seat frame to create a lateral bolster. Additionally, an extension member and an adjustment device may be positioned diagonally across the seat frame to create a diagonal bolster.

It is to be understood that extension members 26 and adjustment devices 34 may be positioned on the seatback frame 22 in various orientations. For example, an extension member and an adjustment device may be positioned longitudinally along the seatback frame to create a longitudinal bolster. An extension member and an adjustment device may be positioned laterally across the seatback frame to create a lateral bolster. Additionally, an extension member and an adjustment device may be positioned diagonally across the seatback frame to create a diagonal bolster.

A variety of advantages may be obtained by use of the present disclosure. Extension members 26 and adjustment devices 34 may be incorporated into a seating assembly frame 14 to allow for varying the sizes of bolsters 42. Movement of the extension members 26 to a compressed position B when an actuation force f is disposed on the extension members 26 may allow for a seatback 54 to form a flat load floor 46 when the seatback 54 is in the folded position F. Utilization of the seating assembly 10 with the extension members 26 in the extended position A may provide comfort and support to an occupant of the seating assembly 10.

Aspects of the present disclosure are also disclosed in co-pending, commonly assigned to Ford Global Technologies, LLC application 84312780 entitled Support Assembly for Seating Assembly, the entire disclosure of which is hereby incorporated herein by reference.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating assembly comprising:
   a seating assembly frame including:
   a seat frame; and
   a seatback frame;

an extension member coupled to the seat frame and movable in response to an actuating force between an extended position relative to the seat frame and a compressed position relative to the seat frame and including:
   an end fixedly coupled to the seat frame; and
   an end coupled to an adjustment device disposed on the seat frame, wherein the adjustment device includes a guide member disposed at a rear portion of the seat frame.

2. The seating assembly of claim 1, wherein the extension member is movable between a primary position in the guide member when the extension member is in the extended position and a secondary position in the guide member when the extension member is in the compressed position.

3. The seating assembly of claim 2, wherein the end fixedly coupled to the seat frame is disposed along a curved plate at a front portion of the seat frame.

4. The seating assembly of claim 3, wherein the guide member includes an oblong structure having a channel through which the extension member slides as the extension member moves between the extended position and the compressed position.

5. A vehicle seating assembly comprising:
   a seatback pivotably coupled to a seat and movable between an upright position and a folded position and including:
   a pair of extension members each coupled to front and rear portions of a seat frame and configured to move from an extended position to a compressed position in response to an actuating force disposed on the pair of extension members by the seatback in the folded position;
   a pair of adjustment devices disposed on opposing lateral sides of the seat frame and at one of the front or rear portions of the seat frame, wherein the pair of adjustment devices are coupled to the pair of extension members, wherein the pair of extension members in the extended position defines a pair of bolsters.

6. The vehicle seating assembly of claim 5, wherein the pair of adjustment devices includes a pair of guides mounted to the seat frame and wherein the pair of extension members slides into each of the pair of guides in a first direction in response to an application of the actuating force on the pair of extension members and wherein the pair of extension members slides out of each of the pair of guides in a second direction in response to a removal of the actuating force from the pair of extension members.

7. The vehicle seating assembly of claim 6, wherein the pair of extension members includes bolster wires.

8. The vehicle seating assembly comprising
   a seating assembly frame including:
      a seat frame; and
      a seatback frame;
   an extension member coupled to the seat frame and movable in response to an actuating force between an extended position relative to the seat frame and a compressed position relative to the seat frame and including:
      an end fixedly coupled to the seat frame; and
      an end coupled to an adjustment device disposed on the seat frame, wherein the adjustment device includes a guide member disposed at a rear portion of the seat frame, wherein the extension member is movable between a primary position in the guide member when the extension member is in the extended position and a secondary position in the guide member when the extension member is in the compressed position, and wherein the end fixedly coupled to the seat frame is disposed along a curved plate at a front portion of the seat frame.

9. The vehicle seating assembly of claim 8, wherein the guide member includes an oblong structure having a channel through which the extension member slides as the extension member moves between the extended position and the compressed position.

\* \* \* \* \*